(12) United States Patent
Seidenberg et al.

(10) Patent No.: US 8,799,641 B1
(45) Date of Patent: Aug. 5, 2014

(54) SECURE PROXYING USING NETWORK INTERMEDIARIES

(75) Inventors: Benjamin E. Seidenberg, Seattle, WA (US); Gregory B. Roth, Seattle, WA (US); Graeme D. Baer, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 28 days.

(21) Appl. No.: 13/328,803

(22) Filed: Dec. 16, 2011

(51) Int. Cl.
| H04L 29/06 | (2006.01) |
| H04L 9/32 | (2006.01) |
| G06F 17/00 | (2006.01) |
| G06F 12/14 | (2006.01) |

(52) U.S. Cl.
CPC ............ *H04L 63/0876* (2013.01); *H04L 63/08* (2013.01); *H04L 63/0428* (2013.01); *H04L 9/3281* (2013.01); *H04L 63/0281* (2013.01); *H04L 63/1416* (2013.01)
USPC ........... 713/153; 713/160; 713/168; 713/170; 713/176; 720/12; 720/22

(58) Field of Classification Search
CPC . H04L 63/0876; H04L 63/08; H04L 63/0428; H04L 63/0281; H04L 63/1416; H04L 9/3281
USPC .......... 726/2, 3, 4, 5, 6, 22, 12; 709/201, 203, 709/227; 713/153, 160, 168, 170, 176
See application file for complete search history.

(56) References Cited

U.S. PATENT DOCUMENTS

| 5,991,810 | A  | * | 11/1999 | Shapiro et al. | 709/229 |
| 6,668,282 | B1 | * | 12/2003 | Booth et al.   | 709/224 |
| 6,978,373 | B1 | * | 12/2005 | Hild et al.    | 713/182 |
| 7,020,645 | B2 | * | 3/2006  | Bisbee et al.  | 1/1 |
| 7,114,180 | B1 | * | 9/2006  | DeCaprio       | 726/18 |
| 7,437,718 | B2 | * | 10/2008 | Fournet et al. | 717/133 |
| 7,555,552 | B2 | * | 6/2009  | Maxted et al.  | 709/225 |
| 7,600,230 | B2 | * | 10/2009 | Desai et al.   | 719/311 |
| 7,647,625 | B2 | * | 1/2010  | Grinstein      | 726/4 |
| 7,890,632 | B2 | * | 2/2011  | Hazlewood et al. | 709/226 |
| 7,979,912 | B1 | * | 7/2011  | Roka           | 726/28 |
| 2002/0059429 | A1 |  | 5/2002 | Carpenter et al. | |
| 2003/0196084 | A1 | * | 10/2003 | Okereke et al. | 713/156 |
| 2004/0015725 | A1 | * | 1/2004 | Boneh et al.   | 713/201 |
| 2007/0157309 | A1 | * | 7/2007 | Bin et al.     | 726/15 |
| 2007/0220605 | A1 |  | 9/2007 | Chien | |
| 2009/0003226 | A1 |  | 1/2009 | Wang et al. | |
| 2009/0013399 | A1 | * | 1/2009 | Cottrell et al. | 726/12 |
| 2009/0083537 | A1 |  | 3/2009 | Larsen et al. | |
| 2010/0138662 | A1 | * | 6/2010 | Ikeda          | 713/179 |
| 2010/0228867 | A1 |  | 9/2010 | Lam | |
| 2010/0268932 | A1 | * | 10/2010 | Bhattacharjee | 713/151 |
| 2010/0299525 | A1 |  | 11/2010 | Shah et al. | |
| 2010/0318665 | A1 |  | 12/2010 | Demmer et al. | |
| 2011/0145912 | A1 | * | 6/2011 | Litvin         | 726/13 |
| 2011/0202683 | A1 |  | 8/2011 | Subramanian et al. | |
| 2011/0231508 | A1 | * | 9/2011 | Torii          | 709/208 |
| 2011/0258703 | A1 | * | 10/2011 | Ramcharran    | 726/25 |
| 2011/0277020 | A1 | * | 11/2011 | Morita et al.  | 726/5 |

* cited by examiner

*Primary Examiner* — Aravind Moorthy
(74) *Attorney, Agent, or Firm* — Robert C. Kowert; Meyertons, Hood, Kivlin, Kowert & Goetzel, P.C.

(57) ABSTRACT

Methods and apparatus for secure proxying using network intermediaries. A system may include one or more servers and a network intermediary. The network intermediary may generate security metadata associated with a client request, comprising an identification of a source of the client request, and transmit an encoded version of the security metadata and a backend request to a server. The server may determine whether the security metadata is valid. If the security metadata is validated, the server may perform one or more operations in accordance with the backend request and the security metadata.

25 Claims, 9 Drawing Sheets

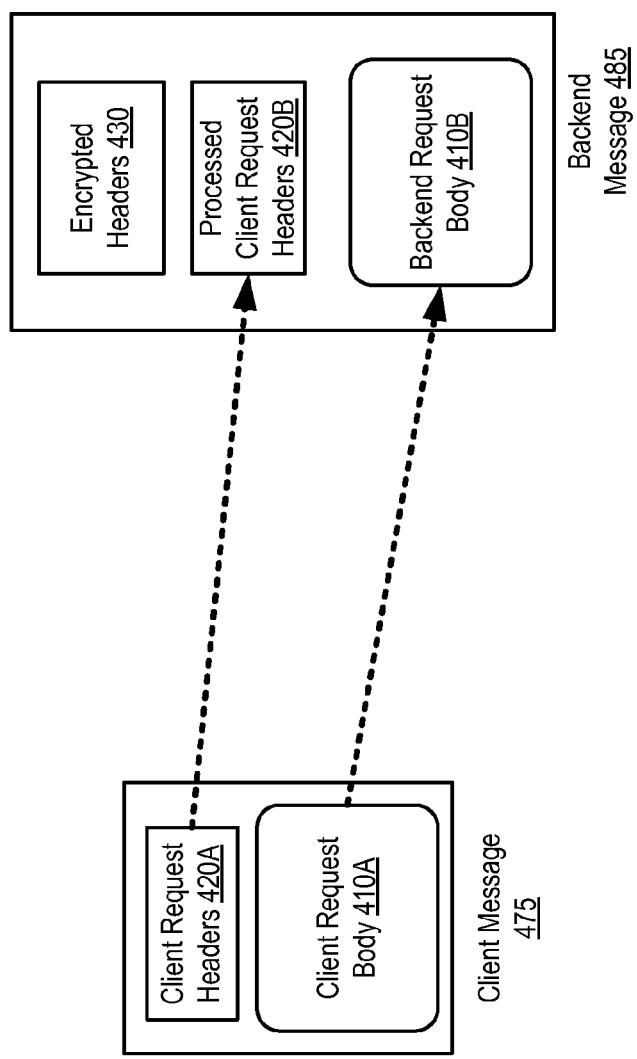

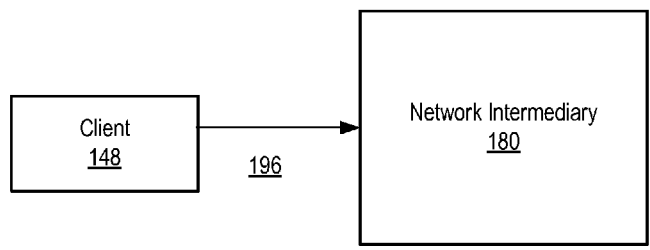
1. Client establishes client connection, e.g., using client-auth SSL 501
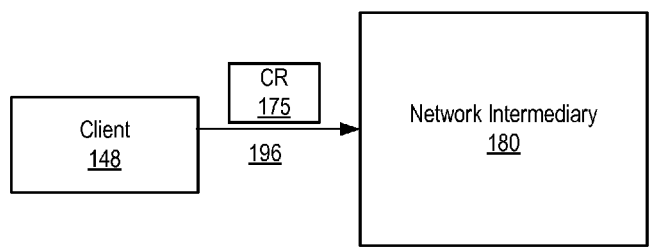
2. Client sends client request 506
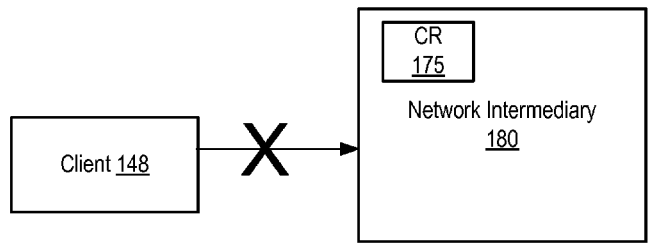
3. Intermediary receives client request, and client connection is terminated 511
*Figure 5a*

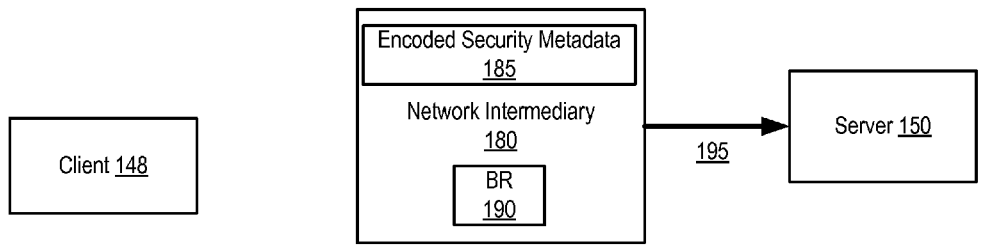
4. Intermediary establishes connection to server 150, generates encoded security metadata and backend request 516
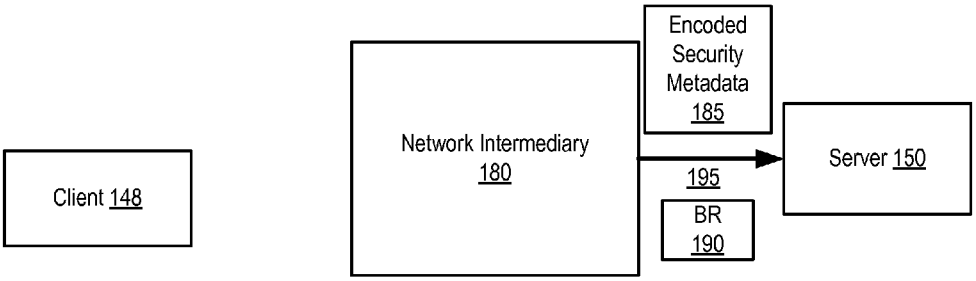
5. Intermediary sends encoded security metadata and backend request (optionally in plain text) to backend server 521
*Figure 5b*

SECURE PROXYING USING NETWORK INTERMEDIARIES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the computing resources have become increasingly complicated.

In some data centers customers of the data center operators may set up elaborate multi-tier architectures to implement a variety of applications. For example, a banking-related application may be set up using a tier of web servers, another tier of application servers, and a final tier of database servers. Each of these layers may have its own performance, availability and security requirements. As the customer base for the provided service expands, the number of instances of servers at each tier may grow; in fact, easy provisioning of expanded compute and storage facilities is one of the main reasons for the recent explosion in cloud computing. As the number of resources being used to provide a given service expands, network intermediary devices such as load balancers may be set up to ensure that the workload is distributed appropriately among the resources, to avoid the performance problems that may otherwise arise. Intermediaries may be set up between several application tiers—e.g., in the above example of a three-tier banking application, load balancers may be set up between external clients and the web server tier, between the web server tier and the application server tier, and between the application server tier and the database tier. Network intermediaries may also be used for security reasons—e.g., for mitigating denial-of-service attacks, request pre-filtering, or as proxy servers that may provide anonymity to the actual servers doing the work.

Some application environments may require that no matter how intermediaries and application tiers are used in the implemented application architecture, the identity of the source of a service request be determined at the server providing the service. For example, a service provider may wish to ensure that the appropriate security policies are enforced, that the correct entities are billed for the service, and so on. In such environments, it may be advisable to take measures to ensure that the identity of service requesters is accurately determined, and that attempts to disguise the origin of service requests are defeated.

BRIEF DESCRIPTION OF THE DRAWINGS

FIG. 4 illustrates an embodiment in which a network intermediary transmits encoded security metadata to a server within a network protocol header.

FIGS. 5a and 5b illustrate an example sequence of operations in which a client connection and a server connection may be established, according to one embodiment.

Figure 1:
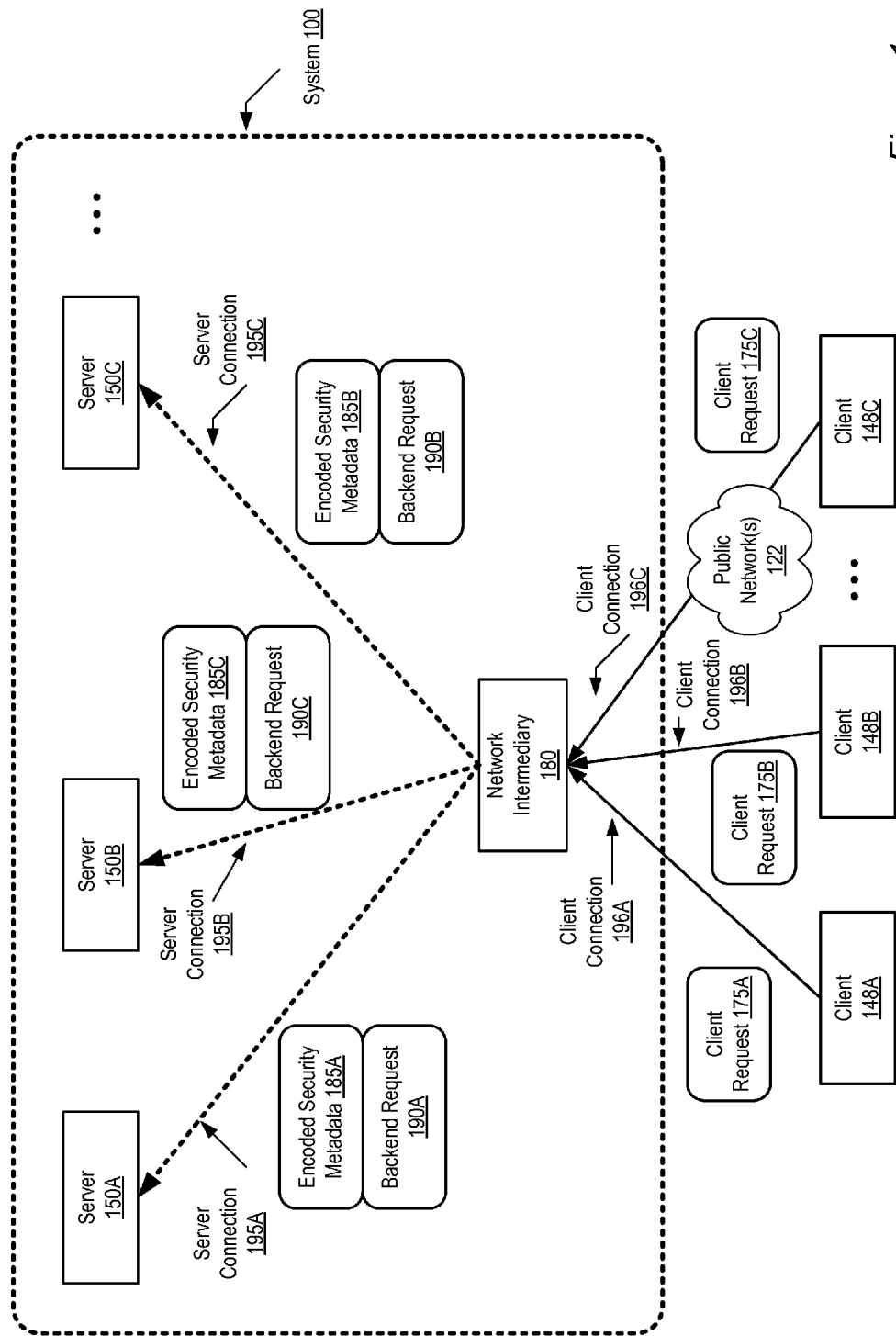
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for managing secure proxying using network intermediaries are described. Networks set up by an entity such as a company or a public sector organization to provide one or more services accessible via the Internet (such as various types of cloud-based computing or storage) to a distributed set of clients may be termed provider networks in this document. Such a provider network may include numerous data centers hosting various resource pools, such as collections of physical and virtualized computer servers, storage devices, networking equipment and the like, needed to implement and distribute the services offered by the provider. Many of these resources may be configured to work together, for example in various tiers of a multi-tier application.

For a number of different reasons, for example to balance load across multiple server instances at a given application tier, or to enhance the security of backend services by preventing direct access from external clients, provider networks may set up network intermediaries such as load balancers or proxy servers in several embodiments. In some environments, network intermediaries may serve as store and forward devices where incoming requests may be queued if necessary before being passed on to the appropriate server or servers, thus avoiding overload problems that may otherwise occur when the rate of service requests spike. A network intermediary between a client layer and a server layer in some embodiments may receive a request from any of a plurality of clients, may perform one or more security-related operations responsive to the request, and may transmit a corresponding server request on behalf of the incoming client request. The server to whom the server request is sent may perform one or more operations in accordance with the client's needs. In order to do the appropriate work on the client's behalf, in some embodiments the server may need to accurately determine the source of the request (e.g., a network address or a client identifier for the client where the request originated). For example, such a determination of the requester's identity may be helpful in determining access to an appropriate physical or virtual resource, in correctly charging for the service, and in maintaining accurate statistics in various embodiments.

In one embodiment, a network intermediary may, upon receiving a client request, generate security metadata for the client request. The security metadata may include any of various elements or fields in various embodiments, including for example an identification of the source of the client request, such as an IP address or a client identifier. The network intermediary may be operable to then encode the security metadata, and transmit the encoded metadata and a backend request corresponding to the incoming client request to a selected server. The server, upon receiving the encoded security metadata, may be operable to determine the validity of the metadata, e.g., whether the metadata is from a trusted source, whether it is formatted as expected, and so on. If the security metadata is found to be valid, the server may perform one or more operations or services depending upon the information included within the backend request or the security metadata. If the security metadata is found to be invalid, the server may reject the backend request or generate one or more error responses.

Example System Environment

FIG. 1 illustrates an example system environment, according to at least some embodiments. The system 100 may include one or more servers 150, e.g., servers 150A, 150B, and 150C of a provider network, set up to provide various types of services to clients 148 (e.g., 148A, 148B, 148C), such as network-based computing services or network-based storage services. Clients 148 may in turn implement a variety of applications using servers 150, such as web server applications or content server applications, and expose them to their own customers. A server 150 may for example be implemented using a virtualized service, such as a virtual computing system or a virtual storage system, which may be resident on portions of one or more physical platforms. Alternatively, a server 150 may comprise one or more applications on a conventional (non-virtualized) operating system running on bare metal hardware. A server 150 that uses a virtual computing system may, for example, include a hardware server with one or more CPUs (as well as associated memory, storage and networking hardware) and the system software (such as a hypervisor and/or elements of an operating system) that implements the virtualization of the computing system, together with the appropriate application software layers. Similarly, a server 150 that uses a virtual storage system may for example comprise portions or all of one or more hardware storage devices (such as disk arrays or storage appliances) and the associated processing elements and software.

A provider network of system 100 may include one or more network intermediaries such as network intermediary 180 in the illustrated embodiment, in addition to the servers 150. Network intermediary 180 may be configured to receive client requests 175 for the services provided at servers 150, from clients 148 over client connections 196 (e.g., 196A, 196B, and 196C). In FIG. 1, for example, client request 175A is received from client 148A, client request 175B from client 148B, and client request 175C from client 148C. Client requests may be formatted according to any desired network protocols in use—e.g., in some environments, they may be formatted according to the HyperText Transfer Protocol (HTTP), and in non-HTTP environments, they may be formatted in accordance with other protocols. Network intermediary 180 may generate security metadata for a received client request 175A in one embodiment, for example including an identification of the requesting client 148 (such as an Internet Protocol (IP) address, a client identifier or account user identifier). Network intermediary 180 may then encode the security metadata (e.g., using encryption or a digital signature), and send the encoded version of the security metadata 185 to an appropriate server 150. In one embodiment the encoded version of the security metadata may be based at least in part on a secret or key held by the network intermediary and at least a portion of the security metadata. A backend request 190 corresponding to the client request 175 may also be sent to the server. In some embodiment, some or all of the contents of a backend request 190 may be contained within the body of a message, while the encoded security metadata 185 may be included within one or more headers of the same message. In the illustrated embodiment, network intermediary 180 sends encoded security metadata 185A and backend request 190A to server 150A in response to receiving client request 175A from client 148A. Similarly, in response to receiving client request 175B from client 148B, network intermediary 180 sends encoded security metadata 185B and backend request 190B to server 150C; and in response to receiving client request 175C from client 148C, network intermediary 180 sends encoded security metadata 185C and backend request 190C to server 150B. The encoded security metadata 175 and the backend requests 190 may be transmitted over server connections 195, e.g., 195A, 195B and 195C, as shown.

The encoded security metadata may be useful at the servers 150 to accurately determine the source of the requested service. For example, in one embodiment the network intermediary 180 may implement a signing or encryption mechanism to encode the security metadata in collaboration with servers 150, e.g., using asymmetric or symmetric signing. On receiving the encoded security metadata 185 in such an embodiment, the server 150 may decode or extract the security metadata to validate it, in accordance with the encryption mechanism being used. If the security metadata is found to be valid, the server 150 may obtain the identity of the source of the corresponding backend request 190, and perform one or more operations on behalf of the client 148 whose client request 175 corresponds to the security metadata and backend request in some embodiments. If the security metadata is found to be invalid, the corresponding backend request 190 may be rejected, and/or one or more error responses may be generated by the server, such as an error message being sent or logged, or a further analysis of the backend request and/or the security metadata being triggered.

The network intermediary 180 may use any of a number of different techniques to accurately determine the source of a given client request 175 in various embodiments—e.g., a client 148 may have set up a client connection 196 using secure sockets layer (SSL) technology, from which the network intermediary 180 may determine the client's identity, and thus be able to include an indication of the identity in the security metadata. The use of the encryption mechanism for the security metadata in collaboration with the network intermediary 180 may result in the server 150 being able to rely on the security metadata in such embodiments, because the server has established a trusted relationship with the network intermediary 180. Thus, even if portions or all of the backend requests 190 are transmitted from network intermediary 180 in plain text in some embodiments, i.e., without encoding or encryption, the server 150 may perform the requested services with a high degree of confidence that it has determined the original requester's identity correctly. By relying on the network intermediary 180 to provide securely encoded source identification information for a requested service, instead of for example relying on the contents of the client request and its associated headers and the like, attempts to "spoof" the requester's identity, or provide incorrect requester information, may be defeated in such embodiments.

As shown in FIG. 1, in some embodiments a client request such as 175C may be transmitted from a client 148 through portions of public networks 122 such as the publicly-accessible Internet to the network intermediary 180. In other embodiments, a client request 175 may be transmitted from a client device over a set of dedicated private links and devices to the network intermediary 180. In general, a given client request 175 may traverse numerous network links and devices such as gateways, routers, switches and the like, before it reaches a network intermediary 180. Neither the client 148 from which the request originated, nor the operator of system 100, may have control or even full knowledge of all the devices through which the client request may have passed on its way to network intermediary 180. Either the requesting client, or some malicious device or software that processes the client request 175 before it reaches network intermediary 180, may include misleading requester identification information within the client request 175 in some environments. For example, in embodiments where the client request 175 is formatted in accordance with the HyperText Transfer Protocol (HTTP) or its variants, an HTTP header field such as the "X-Forwarded-For" header may be used to indicate an IP address on whose behalf the request is being forwarded, and the contents of such a header may be corrupted or falsified maliciously. In some embodiments, network intermediary 180 may also be configured to perform some security-related processing on a received client request 175, e.g., to examine and potentially modify the set of network protocol headers associated with the client request 175. In some embodiments a path between a network intermediary 180 and a server 150 may also comprise a public network similar to network 122—e.g., a network intermediary 180 may form part of a client network.

In one embodiment different network connections may be used for communications between clients 148 and network intermediary 180 on the one hand, and between network intermediary 180 and servers 150 on the other. Different levels of security may be used for client connections 196 than for server connections 195 in some cases. In one implementation, for example, the client connections 196 between the clients 148 and the network intermediary 180 may use a cryptographic protocol such as any appropriate version of the secure sockets layer (SSL) or Transport Layer Security (TLS) protocols. In an environment where a version of TLS or SSL is used, a client 148 and network intermediary 180 may negotiate a stateful client connection 196 by using a handshaking procedure in one embodiment. During this handshake, the client 148 and the network intermediary 180 may agree on various parameters used to establish the client connection's security. The handshake may begin when a client 148 connects to a TLS-enabled network intermediary 180 requesting a secure connection and presents a list of supported ciphers and hash functions. From this list, the network intermediary 180 may pick a cipher and hash function that it also supports and notify the client 148 of the decision. The network intermediary 180 may send back its identification to the client 148 in the form of a digital certificate. The certificate may contain the network intermediary's name, the trusted certificate authority (CA) and the server's public encryption key. The client 148 may optionally contact the server that issued the certificate (the trusted CA) and confirm the validity of the certificate before proceeding. In order to generate the session keys used for the secure connection, the client 148 may encrypt a random number with the network intermediary's public key and send the result to the network intermediary 180. The network intermediary may be able to decrypt it with its private key. From the random number, both parties may generate key material for encryption and decryption. This may conclude the handshake and may begin the secured connection, on which messages which may be encrypted and decrypted with the key material until the connection closes.

A client-authenticated TLS connection may be implemented in one embodiment, in addition to or instead of the server authentication described above. During a client-authenticated handshake, the client 148 may send a client certificate to the network intermediary 180 in one such embodiment. The network intermediary may include the client-provided certificate in the security metadata it generates in some embodiments in response to receiving a client request 148. In some implementations, e.g., where the network intermediary 180 and the servers 150 are part of a highly secure network maintained by an operator of the provider network of system 100, network intermediary 180 may not need to use SSL and/or TLS for server connections 195, e.g., in order to avoid some of the overhead associated with these types of protocols. In such embodiments, portions or all of the contents of backend requests 190 may be sent in plain text to servers 150. An operator of system 100 may ensure in such embodiments that traffic enters its network only through a small set of edge devices such as routers and gateways which implement sophisticated levels of security, thus reducing the need for securing communications between the devices within the network, such as network intermediaries 180 and servers 150.

In some embodiments, one or more server connections 195 may be set up in advance of, or independently of, client connections 196, e.g., using a connection pooling technique so that network intermediary 180 may avoid the overhead of having to set up new server connections frequently. In such embodiments server connections 195 may persist for some time, and a given server connection 195 may be re-used for multiple backend requests. In one implementation, a different server connection 195 may be used for the encoded security metadata 185 associated with a backend request 190, than for the backend request 190 itself. In another implementation, the task of determining the identity of a requester may be performed at one server 150A, and the operations requested may be performed by a different server 150B—e.g., the encoded security metadata 185A may be transmitted over one server connection 195A to one server 150A, and the backend request 190A may be sent over a different server connection 195B to a different server 150B. In many embodiments the network intermediary 180 may be configured to terminate the client connection 196 on which a client request 148 is received, e.g., prior to, in parallel with, or after generating the corresponding encoded security metadata 185 and sending it on to a server 150. In other embodiments client connections 196 may persist for some time as well.

A network intermediary 180 may encode the security metadata to produce the encoded versions 185 using a variety of techniques in different embodiments. For example, the network intermediary in some embodiments may use a digital signature algorithm, using asymmetric or symmetric signing, a hash-based message authentication code (HMAC), or some other transformation methodology to encode the security metadata in such a way that the receiving server 150 is able to ensure that the security metadata is from a trusted source and has not been tampered with. Depending on the algorithm being used, one or more keys may be exchanged between a server 150 and network intermediary 180 in some embodiments. In some embodiments any of various elements of information may be included within the security metadata in addition to the identity of the requesting client, e.g., to enhance the security of the communicated data and make it even harder for a malicious entity to mislead the server. For example, in one such embodiment an indication that the network intermediary has completed processing of the client request 148 may be included within security metadata. Several such elements are discussed in further detail below in conjunction with the description of FIG. 2.

In one implementation, the encoded security metadata 185 may be included within a networking protocol header associated with the backend request 190. For example, in an environment where HTTP is being used, the network intermediary 180 may include an X-Forwarded-For header identifying the source of the client request, or verify that an existing X-Forwarded-For header is accurate. An X-Forwarded-For header may include a comma-separated list of IP addresses including the identification of the client as well as the addresses of various proxies that have passed on the request, e.g., "X-Forwarded-For:<client IP>,<proxy1 IP>, <proxy2 IP>". Other protocol-appropriate headers may be used for the security metadata, e.g., in environments where HTTP is not used. In one environment client requests may be non-HTTP requests that may, for example, use lower-level protocols belonging to the Transmission Control Protocol/Internet Protocol (TCP/IP) suite of protocols—for example, a client request 148 may be formatted according to TCP or UDP (User Datagram Protocol), and may not include any HTTP headers. In one implementation, another application layer protocol such as SPDY may be employed, and headers for it may be used for the security metadata. Any suitable networking protocol may be used for the client connections 195 and the server connections 196 in various embodiments. A backend request 190 may, in some embodiments, comprise part or all of the body or contents of the corresponding incoming client request 148, e.g., after performing a security analysis of the incoming request, the network intermediary may pass on the body of the client request 148 unchanged to a server 150 as a backend request 190. In other embodiments a network intermediary 180 may modify one or more headers of the client request—e.g., if the network intermediary is able to detect a header with misleading information, such as an X-Forwarded-For HTTP header inserted by some other party, the network intermediary 180 may modify, replace, or delete such a header. In some embodiments a network intermediary may even modify portions of the body of a client request 148, i.e., the backend request body may differ from the client request body. In some embodiments where protocols other than HTTP may be used, one or more headers for the other protocols may be modified instead.

Network intermediary 180 may be implemented using any appropriate combination of hardware and software elements in different embodiments. In some embodiments, for example, network intermediary 180 may comprise a load balancer, such as a hardware load balancer or a software load balancing application that runs on general purpose hardware. In other embodiments a network intermediary 180 may comprise a proxy server that, for example, forwards client requests 148 to a backend server 150 and may also forward the server's responses back to the requesting client. In one embodiment the network intermediary may comprise a store-and-forward device similar to, for example, an intelligent switch, which may enqueue incoming client requests if needed before transmitting corresponding backend requests. In some implementations, a given network intermediary may serve multiple roles—e.g., a store and forward device may also implement load balancing. Depending on the implementation, a network intermediary may use a server selection policy to identify the target server 150 to which a particular backend request 190 is sent. For example, a particular server 150 may be selected in order to distribute or balance client load across a set of servers, or it may be selected based on the fact that it was the last server to which a request from the client 148 was sent, and thus may have some contextual information (such as cached data) that may make it easier to service the request. In some implementations servers may be chosen at random from among a set of available servers. In other implementations there may be a one-to-one correspondence between the network intermediaries 180 and the servers 150, i.e., a given network intermediary 180 may be configured to submit backend requests to a single server 150. In one embodiment the network intermediary 180 may comprise an intelligent device or service capable of inspecting a client request 148 and determining, based on the nature of the request, which server 150 should be used. A given client request 148 may result in multiple backend requests 190 in some embodiments—e.g., a network intermediary 180 may be capable of splitting up the work requested by a client 148 into multiple tasks that may be performed in parallel by several servers 150.

Example Constituent Elements of Security Information

Figure 2:
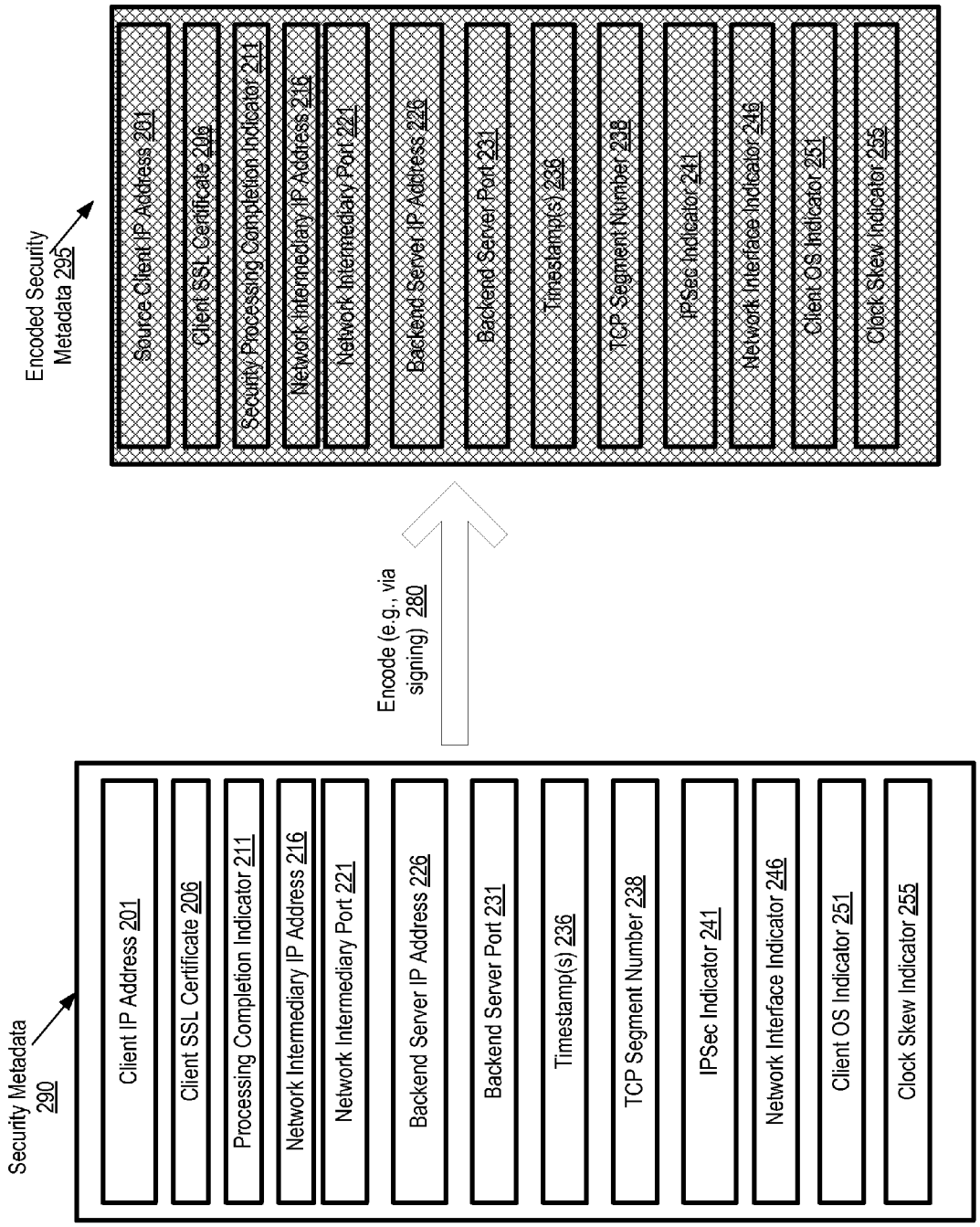
FIG. 2 illustrates examples of some of the constituent elements that may be included in security metadata generated by a network intermediary, according to at least some embodiments.

FIG. 2 illustrates examples of some of the constituent elements that may be included in security metadata 290 generated by a network intermediary 180 upon receiving a client request 175, according to at least some embodiments. Only a subset of the elements or fields shown in FIG. 2 may be used in many implementations; that is, in a given implementation several of the elements shown may be omitted. The security metadata 290 may include an IP address 201 of the client 148 at which the request originated. Network intermediary 180 may determine the source client IP address 201 based on the establishment of the client connection 196, for example, during which the client 148 may have provided its IP address. In some embodiments, as noted above, the client connection may use SSL or TLS, and network intermediary 180 may have determined the IP address of the client during the establishment of the SSL/TLS connection. The client IP address may also be available from one or more network protocol headers of the client request 175 in some embodiments, such as X-Forwarded-For headers in the case of the HTTP protocol, or from TCP, IP or UDP headers which may be accessible in non-HTTP environments where other application-level protocols than HTTP may be in use. In some environments clients may include their IP addresses (or some other identifier such as a client account identifier or user identifier) within the body or headers of client requests 148. In cases where the client IP address or other client identification information is susceptible to spoofing or manipulation, e.g., if it is transmitted in plain text to the network intermediary, in some embodiments the network intermediary may be configured to treat the plain-text information with suspicion, e.g., by confirming the client IP address using some other technique before including it in the security metadata. In embodiments where client connections 195 are set up using client authentication SSL/TLS, where the client provides a certificate to the network intermediary 180, the network intermediary may include the client's SSL or TLS certificate 206 within the security metadata 290.

Security metadata 290 may in some embodiments comprise an indicator 211 of a completion of processing of the client request 148 by the network intermediary 180. By providing such an indicator to a server 150, the network intermediary 180 may confirm to the server 150 that the security metadata is from a trusted source. For example, the processing completion indicator may include an identification of the network intermediary 180 (such as a 256-bit hexadecimal string) that is decodable by, or understood by, the servers and the network intermediaries of a provider network of system 100, and may be unintelligible (and hard to fabricate) by entities outside the provider network. In some implementations the processing completion indicator 211 may comprise a timestamp indicating a time at which the processing was completed. Such a timestamp could, for example, be compared with other timestamps previously received by a server 150 from the network intermediary 180 to make sure that the timestamps are in an expected increasing order, thereby further enhancing the trustworthiness of the security metadata 290 from the point of view of the server 150.

In some embodiments the network intermediary 180 may include details related to the server connection 195 within security metadata 290, which may help to uniquely identify the network intermediary 180 as the trusted source of the security metadata (and reduce the chances that the server 150 is unable to detect that some malicious entity altered or generated the metadata). For example, the network intermediary 180 may include any combination of the following information: the IP address 216 of the network intermediary being used for the server connection, the port 221 being used at the network intermediary for the connection, the backend server IP address 226, the backend server port 231, the current TCP segment number 238 for the server connection, and one or more timestamps 236 associated with the connection (such as a 4-byte sender timestamp and/or a 4-byte echo reply timestamp value). This combination of information that may be specific to the current state of a server connection 195 may be very difficult to forge, and may thus also be usable as an indicator of the authenticity of the security metadata 290.

Clients 148 may use the Internet Protocol Security (IPSec) protocol suite for communicating with the network intermediary 180 in some environments. In one such embodiment, an indication 241 that IPSec was used may be included within the security metadata 290. Indication 241 may include details about the IPSec communications between the client 148 and the network intermediary 180, which may enable the server 150 to validate the identity of the requesting client 148. In some environments a network intermediary 180 may receive client requests 148 over several different network interfaces—for example one interface on which traffic that has passed through the public Internet is received, and another interface on which traffic that has passed through only private dedicated links of the client's network or of a provider network of system 100 is received. It may be helpful in such environments for the server 150 to know which interface was used by the client request—for example the server may be able to access the appropriate set of data or resources based on such information, or the server may make or validate billing decisions based on such information. A different billing rate may be in use for requests that come in over private networks than the billing rate used for requests received via the public Internet in some such environments, and the server may ensure that the correct billing rate is being used using an indication 246 of the network interface used. In some embodiments an indication 251 of the operating system being used by client 148 may also be helpful to a server 150 in verifying the client's identity, and/or in providing the requested service. An indication 255 of a clock skew between the network intermediary 180 and the server 150 may also be included in some environments—for example the server 150 may maintain such clock skew information for each of a set of trusted network intermediaries 180, and may thereby verify whether the security metadata is from one of those trusted intermediaries or not. Other types of information may be included within the security metadata 290 in some embodiments, such as a version of a security protocol (such as SSL/TLS) being used by the client, a version or release number of an application or driver being used by the client and/or the network intermediary, and so on.

Having generated the security metadata 290, the network intermediary may then encode it, as indicated in the arrow labeled 280 in FIG. 2, e.g., by digitally signing at least a portion of the security metadata in some embodiments. The encoded security metadata 295 may then be transmitted to a selected server 150. The server 150 may then validate the security metadata using any of a number of techniques. For example, in one embodiment it could decrypt the encoded security metadata 290, e.g., using an asymmetric or symmetric key, and if the decoded security metadata is found intelligible and in an expected format, the contents of the security metadata may be considered valid. In an embodiment where the security metadata comprises some indication of a network intermediary's identity such as a network intermediary identifier, the server 150 may compare that identifier to a known set of identifiers of trusted network intermediaries, and conclude that the security metadata is valid if the identifier included within the security metadata matched an identifier in the trusted set. In some implementations a timestamp or a clock skew indicator included within the security metadata 290 may be checked for logical consistency with previously received timestamps or clock skew information to validate the data. In some embodiments both the security metadata and the backend request may be encrypted or digitally signed before being transmitted to the server 150.

Network Intermediary Role Examples

Figure 3A:
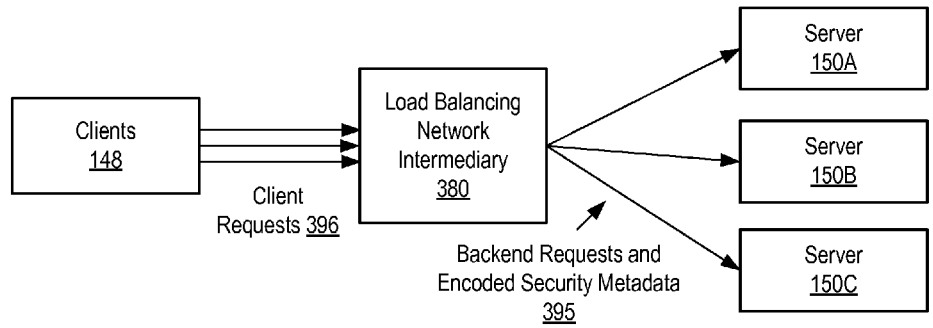
FIGS. 3a-3c illustrate examples of types of functional roles that a network intermediary may play in various embodiments.
Figure 3B:
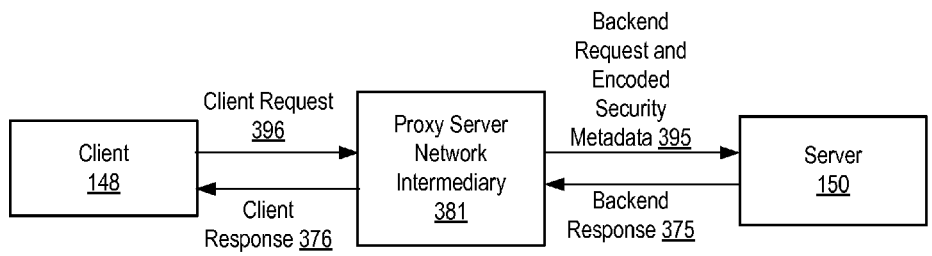
Figure 3C:
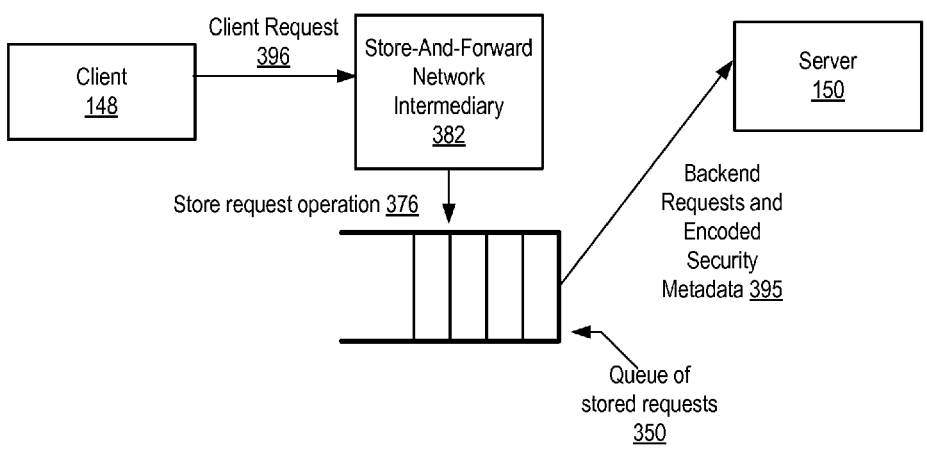

FIGS. 3a-3c illustrate examples of types of functional roles that a network intermediary 180 may support in various embodiments. FIG. 3a illustrates an embodiment in which a network intermediary 380 is responsible for load balancing client requests 396 received from clients 148, i.e., for distributing the corresponding backend requests (and encoded security metadata) 395 among a set of servers 150, each of which may be capable of performing the desired service. A load balancing network intermediary 380 may be configured to use any desired algorithm to choose a particular server 150 for a given client request 148 in various embodiments: for example, it could use a round-robin algorithm, a random selection algorithm, or a least-loaded algorithm in which it attempts to send an incoming request to the server that it believes to have the lowest current utilization or load level. In some embodiments a load balancing network intermediary 380 may attempt to implement "sticky sessions" or otherwise take advantage of locality in selecting a server 150—e.g., it may keep track of which server 150 was used last on behalf of a given client 148 or a client session, and may direct additional requests from the same client 148 or of the same client session to that server 150. Locality-based algorithms may be useful to improve performance because the server 150 may be able to maintain context information, or cache a working set of data on behalf of a client or session, that may be reusable for subsequent requests. The operations performed by the selected server 150 may be synchronous in some embodiments, in which case a response may be sent back to the client as soon as the desired service is completed, or asynchronous, in which case a reply may not be sent immediately; in some cases, no reply may be needed at all. Replies may, in some implementations, take different network paths back to the client than the incoming requests did.

In one embodiment, as shown in FIG. 3b, a network intermediary may serve simply as a proxy between a client 148 and a server 150. Proxy servers may in general hide the details of backend servers (e.g., the ports being used at a backend server to provide a particular service) from clients 148 to enhance the security of the servers. A client 148 may connect to the proxy server network intermediary 381, requesting some service such as a file, connection, or web page. The proxy server network intermediary 381 may in some embodiments evaluate the client request 396 according a set of filtering rules, such as rules that restrict the types of operations supported, or the types of application level protocols supported. If the client request 148 is found acceptable according to the filtering rules, the proxy server network intermediary 381 may transmit a corresponding backend request 395 together with encoded security metadata to a server 150 capable of performing the requested operations. A backend response 375 may be received from the server 150 in some embodiments, and a corresponding client response 376 may be transmitted to the client 148 by the proxy server network intermediary 381. In some cases a subset of client requests 148 may be handled by the proxy server network intermediary 381 without resorting to servers 150, e.g., if the client request is for some data that is cached at the network intermediary.

FIG. 3c illustrates an example scenario where a network intermediary 382 acts as a store-and-forward device, according to one embodiment. Such a network intermediary may be configured to store incoming client requests 396 in a buffer or queue 350 if needed, before transmitting the corresponding backend requests and encoded security metadata 395 to a server 150. The buffering or queuing operation 376 may be helpful for a number of reasons—to handle spikes in client request workloads, for example, which may otherwise overwhelm the server 150, or to smoothen the arrival rate of backend requests at servers 150 in order to reduce the variability in service response times. In some implementations the buffering may allow the network intermediary to perform some validation or checking operations, which may take some time and may therefore be more effective if the requests are buffered until the validation can be completed.

Several other types of operations may be performed by network intermediaries in different embodiments, such as client request logging, network intrusion detection, routing, and the like. In some implementations, a given network intermediary may serve in multiple roles—e.g., a store and forward network intermediary may also implement load balancing. In one environment, a network intermediary may be responsible for implementing a type of high availability by, for example, sending two or more identical backend requests to respective servers 150, so that the service requested by the client may be performed even in the event of a failure at one of the servers.

Use of Network Protocol Headers for Security Metadata

FIG. 4 illustrates an embodiment in which a network intermediary 180 transmits encoded security metadata to a server 150 within a network protocol header. In the illustrated embodiment, a client message 475 is received at the network intermediary 180, containing a message body and one or more message headers. The client request body 410A may comprise the details of the service requested by the client, e.g., a request to look up some information in a backend database based on some query parameters. The client request headers section 420 of client message 475 may contain a number of different headers, depending on the network protocol or protocols being used. In implementations where HTTP is being used, for example, the headers section 420 may comprise fields specifying acceptable content types, acceptable character sets, languages, cache controls, one or more cookies, content-length indicators, a referrer, and the like. In some embodiments the headers section 420 may also include some identification information of the client, e.g., an X-Forwarded-For field that specifies (or at least appears to specify) the client IP address and the addresses of proxy servers that have forwarded the request thus far, an email address of the requester, or the like.

In the embodiment illustrated in FIG. 4, the network intermediary may analyze the incoming client message 475. For example, the headers section 420 may be inspected, e.g., to remove or modify any potentially misleading information that may be contained therein, such as an incorrect client IP address in an X-Forwarded-For header. The network intermediary may generate a processed version 420B of the client request headers. i.e., the processed version 420B may contain any modifications the network intermediary may make to the client request headers as a result of its analysis. In some cases the network intermediary 180 may not need to make any changes to the client headers, and the processed version 420B may include the same fields and values that the original client headers section 420A contained. The network intermediary 180 may also analyze the client request body 410A in some embodiments, and generate the backend request body 410B based on this analysis. If no changes are made to the client request body 410A, the client request body contents may simply be copied into the backend request body 410B in some embodiments. The encoded version of security metadata may be included within one or more encrypted headers 430 by the network intermediary, and the backend message 485 comprising the backend request body 420B, the encrypted headers 430 and the processed client request headers 420B may be sent on to a selected server 150.

Headers at any appropriate level or combination of levels of a networking software stack may be used for the encoded security metadata 185 in various embodiments. For example, application layer protocol headers such as HTTP headers may be used in some environments, while headers for transport layer protocols such as TCP or UDP may be used in other embodiments. In some implementations headers at multiple layers may be used for the encoded security metadata.

Client Connections and Server Connections

FIGS. 5a and 5b illustrate an example sequence of operations in which a client connection and a server connection may be established, according to one embodiment. As shown in element 501 of FIG. 5a, a client 148 may initially establish a client connection 196 to the network intermediary 180. Depending on the security scheme being used, the client may request that the connection may be set up using a desired version of SSL or TLS, in either server-authenticated mode, where the network intermediary provides a certificate to the client, or in client-authenticated mode, where the client also provides a certificate to the network intermediary. In some environments an unencrypted client connection 196 may be established instead.

After the requested connection 196 is established, the client may transmit its client request 175 to the network intermediary 180, as shown in element 506 of FIG. 5a. Upon receiving the client request 175, the network intermediary may in some embodiments terminate the client connection 196, as illustrated in element 511 of FIG. 5a, for example to free up resources such as memory or buffers at the network intermediary that may otherwise remain in use as long as the client connection remains open. Even in cases where resource constraints do not make client connection termination a necessity, it may still be worthwhile for the network intermediary to terminate client connections in several types of environments: e.g., in environments where response messages back to the client may be asynchronous, or may take a different route back to the client 148 that does not include the network intermediary 180, or in environments where response messages are not required at all. In some embodiments a client connection 196 on which a client request is received may be terminated or closed even when a response message is eventually sent back to the client via the network intermediary; in such a case, the response message may be sent over a different connection. In other embodiments, client connections may be kept open for some periods of time, e.g., to receive additional client requests or to send back response messages to clients from the network intermediary. In some implementations the clients 148 may terminate client connections 196 instead of the network intermediary 180.

As shown in elements 516 and 521 of FIG. 5b, in the illustrated embodiment the network intermediary may establish a server connection 195 to transmit the encoded version of the security metadata 185 and the backend request 190 corresponding to the client request. In other embodiments, the network intermediary may set up one or more server connections 195 prior to receiving a client request 175, e.g., as part of an application startup for a service being implemented at a server 150, and may re-use the server connections as needed for different client requests. In some embodiments, some of the operations illustrated in FIGS. 5a and 5b may be performed in an order different than that shown. For example, the network intermediary 180 may generate, encode and transmit the security metadata and the backend request prior to terminating the client connection 196 in some embodiments.

Server Connection Options

Figure 6A:
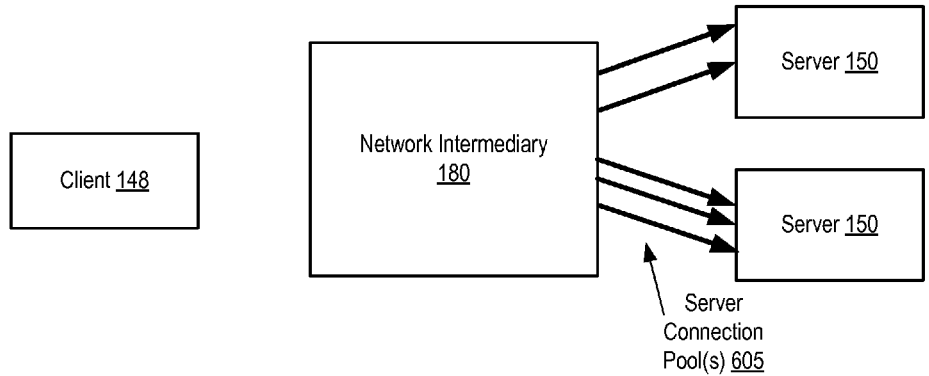
FIGS. 6a-6c illustrate several example server connection configurations, according to at least some embodiments.
Figure 6B:
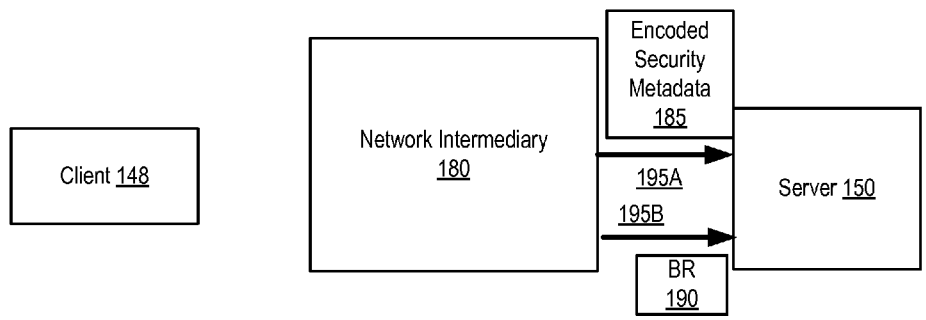
Figure 6C:
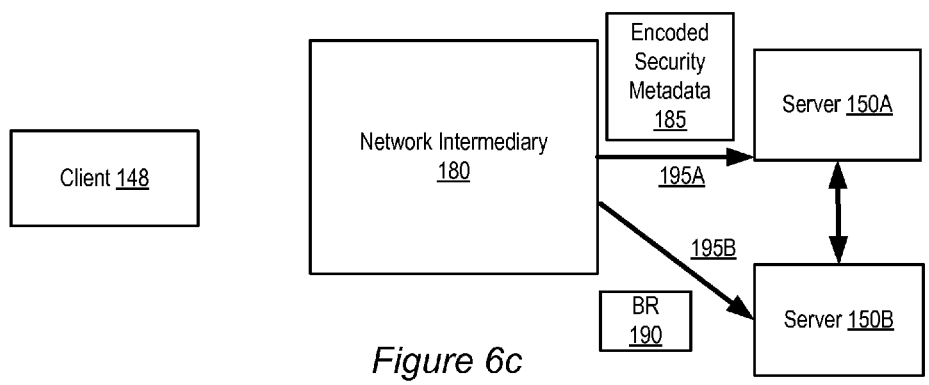

FIGS. 6a-6c illustrate several example server connection configurations, according to at least some embodiments. In some embodiments, as illustrated in FIG. 6a, a network intermediary 180 may be configured to establish one or more server connection pools 605 to servers 150. For example, in one environment each server 150 may comprise one instance of a clustered application server, and a load balancing network intermediary 180 may set up one or more network connections 195 to each application server instance, e.g., as the instances are brought online. In some embodiments the number of connections in a given connection pool 605 may be configurable via parameters at the network intermediary 180 and/or the servers 150. In some implementations a minimum connection pool size, a maximum connection pool size, a number of connections by which the pool should be expanded or shrunk as needed based on usage, and/or various other parameters governing the connection pool may be specified using dynamic or static configuration options. In some environments with high availability requirements, multiple redundant connections may be set up between a network intermediary 180 and a server 150, e.g., with different physical network links being used for each connection. The level of server connection security may vary in different implementations. For example, in some implementations the network intermediary 180 and the servers 150 may be part of the same private provider network to which access from external entities is restricted; in such an implementation techniques such as SSL/TLS may not be necessary for the connections between the network intermediary 180 and the servers 150, and may not be implemented to avoid overhead. Portions or all of the backend requests may be transmitted in plain text in such embodiments. In other implementations, for example where there may be some potentially insecure devices between a network intermediary 180 and servers 150, connection pools 605 may comprise SSL/TLS connections as needed. Secure communication protocols other than SSL/TLS may be used (for either server connections, client connections, or both server and client connections, as needed) in other embodiments.

In some embodiments a network intermediary 180 may transmit the encoded security metadata 185 to a server 150 over a different channel or path than the backend request 190. FIG. 6b illustrates one such embodiment where server connection 195A is used for the security metadata and server connection 195B is used for the backend request. This type of configuration may be useful, for example, where different server connections 195 implement different levels of security: the security metadata may be sent over more secure channels than the backend request, for example. In some such implementations the encoded security metadata 185 may comprise an identification of the corresponding backend request 190 and/or a backend request 190 may comprise an identification of the corresponding encoded security metadata 185, enabling the server 150 to determine which security metadata corresponds to which backend request.

In one embodiment illustrated in FIG. 6c, the encoded security metadata 185 may be sent to one server 150A, while the corresponding backend request 190 may be sent to another server 150B. This type of arrangement may be useful in environments where, for example, a subset of the servers 150 (e.g., server 150A in FIG. 6c) is allocated to performing security-related processing such as auditing or validating requests, and another subset of servers 150 (e.g., 150B) may be allocated to perform the actual services requested. In some embodiments, multiple copies of the encoded security metadata and/or the backend request may be sent, e.g., one copy each to two servers, to provide highly-available service where a failure at one server 150 does not prevent the requested service from being provided.

Methods for Interface Record Operations

Figure 7:
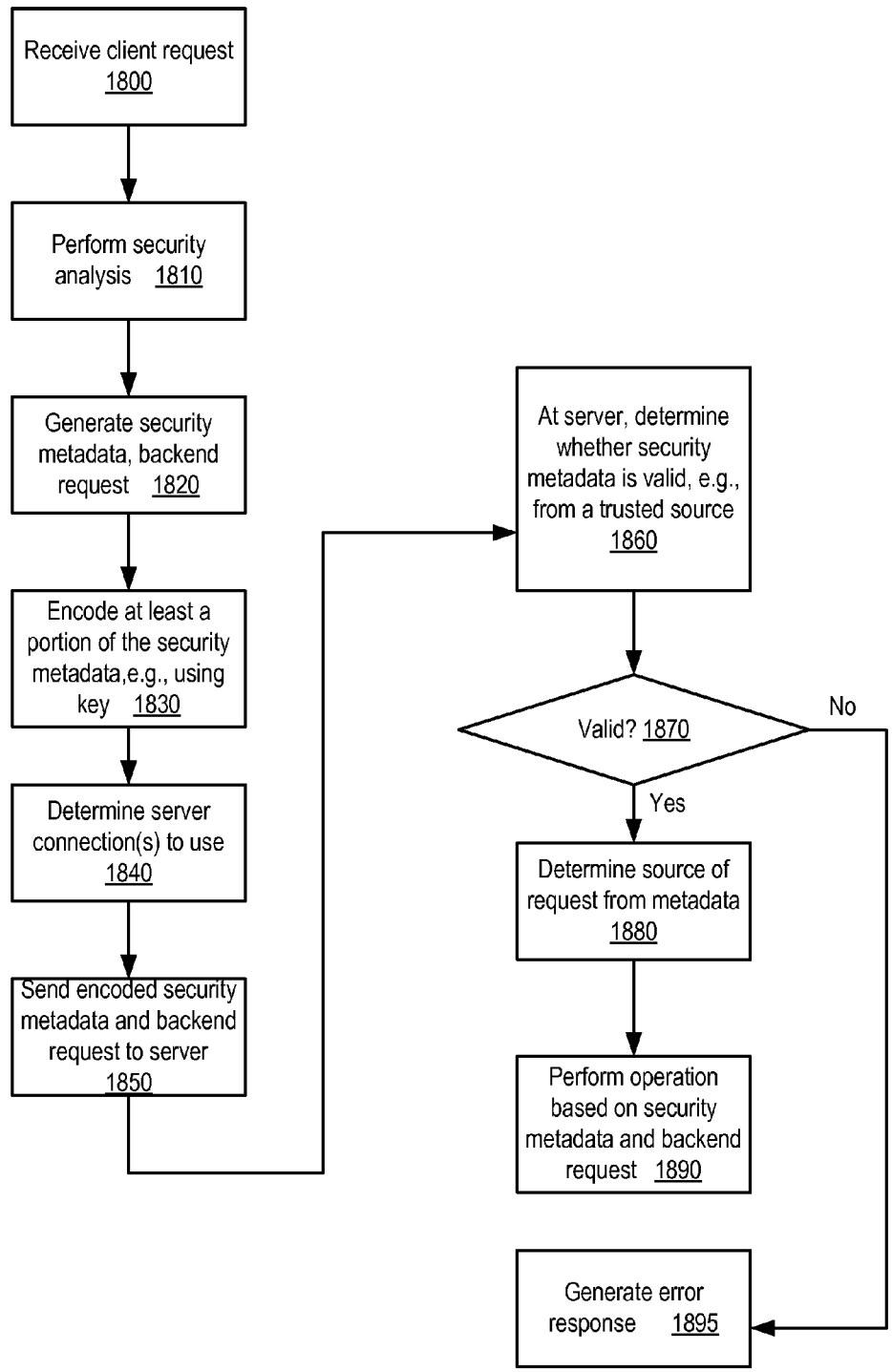
FIG. 7 is a flowchart of a method for implementing secure proxying using network intermediaries, according to at least some embodiments.

FIG. 7 is a flowchart of a method for implementing secure proxying using network intermediaries, according to at least some embodiments. As shown in element 1800 in the flowchart, a client request 175 may be received at a network intermediary 180. The network intermediary 180 may in some embodiments perform one or more security analysis operations on the client request, as indicated in element 1810. For example, the network intermediary 180 may inspect the client request for potentially fraudulent headers such as spoofed X-Forwarded-For HTTP headers. The network intermediary may generate security metadata and a backend request corresponding to the client request, as indicated in element 1820. The security metadata may comprise an identification of the source of the client request, such as an IP address or client identifier in some embodiments. Some portion or all of the security metadata may then be encoded, e.g., using a digital signature algorithm, a hash function, or any other appropriate transformation mechanism, as indicated in element 1830. A key or secret held by the network intermediary may be used to generate the encoded version of at least part of the security metadata in some embodiments.

In embodiments where multiple server connections 195 may be available, the network intermediary 180 may determine which server connection or connections to use, as indicated in element 1840 of FIG. 7, and transmit the encoded security metadata and the backend request to a selected server 150 or servers, as indicated in element 1850. In some embodiments, the encoded security metadata may be incorporated within a network protocol header and the backend request may be incorporated within the associated message body. In other embodiments, the encoded security metadata and the backend request may each be incorporated within different network messages or packets.

When a server 150 receives the encoded security metadata, it may perform one or more operations to validate the security metadata (element 1860 of FIG. 7). For example, if an encryption algorithm was used to encode at least a portion of the security metadata, it may use the corresponding decryption algorithm and check that the syntax or format of the metadata conforms to its expectations. In some cases the contents of the security metadata, such as an identifier of the network intermediary that performed security analysis of the corresponding client request, may be checked, e.g., by comparing the identifier to a list of identifiers of known and trusted network intermediaries. If the security metadata is found to be valid (as determined in element 1870 of FIG. 7), the identity of the source of the request (i.e., the client 148 that submitted the client request on behalf of which the backend request was transmitted) may be determined in some embodiments (step 1880). The server 150 may perform one or more operations based on the contents of the backend request and/or the security metadata, as indicated in element 1890. If the security metadata was found to be invalid, as also determined in element 1870, the server may generate an error response (element 1895), e.g., by logging or sending an error message, or by initiating further analysis of the backend request or the security metadata. In some embodiments invalid security metadata may simply lead to the rejection of the corresponding backend request. One or more of the operations illustrated in the elements of FIG. 7 may be omitted in some embodiments; for example, in one embodiment there may only be one server 150 with which a network intermediary 180 is configured to communicate, in which case there may be no need to choose or determine which server connection is to be used, and the operations corresponding to element 1840 may be omitted.

Example Use Cases

The techniques of network intermediaries securely identifying the sources of incoming requests to the backend servers responsible for performing the requested tasks described above may be helpful in a variety of scenarios in different embodiments. In particular, in many instances the income of a service provider may be tied to service usage levels of their customers—e.g., the billing amount charged to a given customer may be proportional to the number of megabytes or gigabytes of traffic generated on behalf of requests that the customer makes. The requests from the customers may be routed through a number of different networks operated by different vendors before they reach the network intermediaries operated by the service provider; in some cases it may even be hard to identify all the different vendors involved. Malicious customers or third parties may attempt to mislead the service provider regarding the billable entity on whose behalf a request is submitted, and the techniques of generating and securely encoding security metadata identifying the requesting client may be helpful in defeating such efforts. In addition, in environments where the servers 150 operate on highly sensitive data, such as for example defense-related data, health-care related data and the like, it may be advisable to take as many precautions as possible to prevent fraudulent requests from being fulfilled.

Illustrative Computer System

Figure 8:
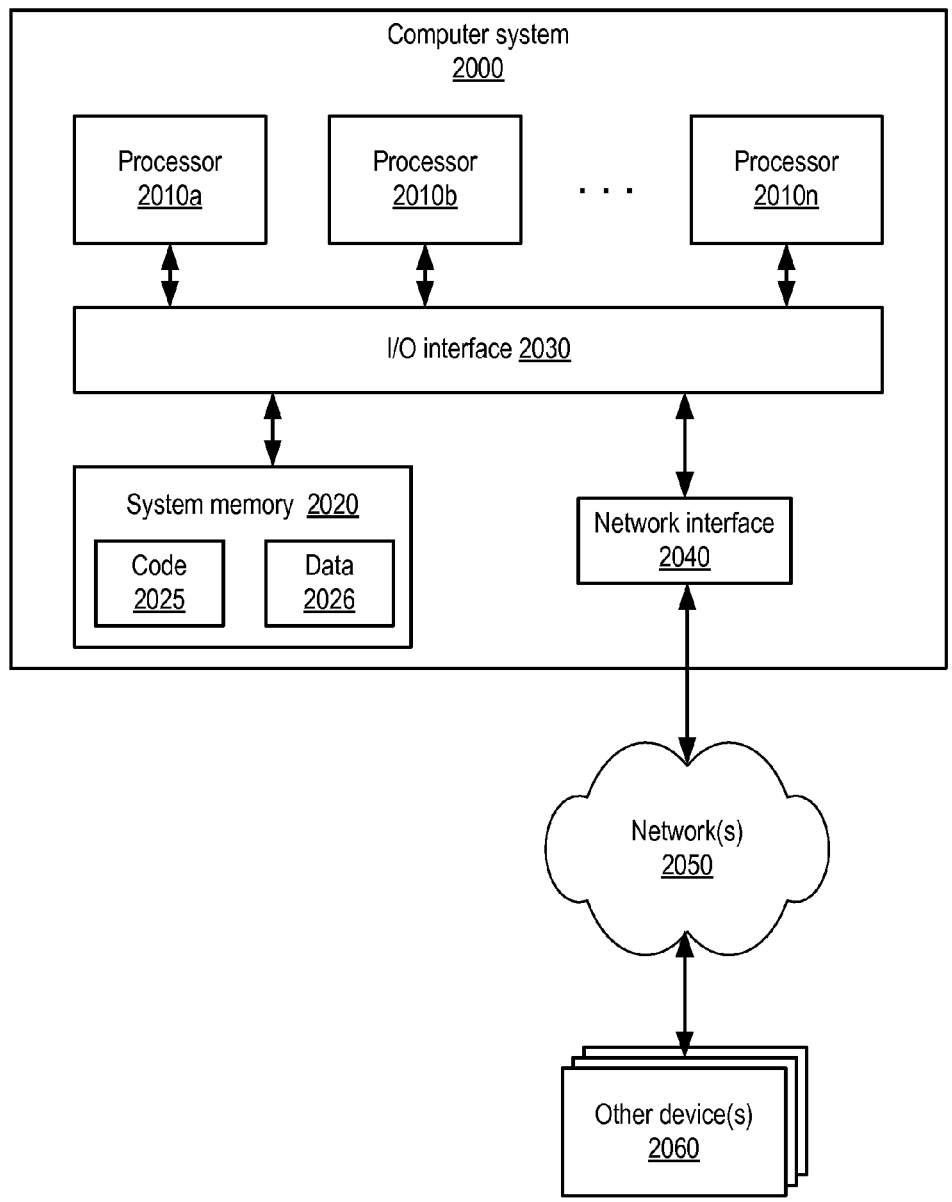
FIG. 8 is a block diagram illustrating an example computer system that may be used in some embodiments.

In at least some embodiments, a server that implements a portion or all of one or more of the technologies described herein, including the techniques to generate and encode security metadata on behalf of client requests, to validate the security metadata and perform the requested operations, may include a general-purpose computer system that includes or is configured to access one or more computer-accessible media, such as computer system 2000 illustrated in FIG. 8. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 7, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 7 for implementing embodiments of methods and apparatus for virtual network interface records. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040. Portions or all of multiple computer systems such as that illustrated in FIG. 8 may be used to implement the described functionality in various embodiments; for example, software components running on a variety of different devices and servers may collaborate to provide the functionality. In some embodiments network devices such as intelligent switches, routers, gateways or other appliances may be used

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more servers; and
a hardware device configured to implement a network intermediary;
wherein the network intermediary is configured to:
   receive a client request;
   generate security metadata associated with the client request, wherein the security metadata comprises an identification of a source of the client request; and
   transmit an encoded version of the security metadata and a backend request corresponding to the client request to a server of the one or more servers, wherein the encoded version is based at least in part on at least a portion of the security metadata and a key held by the network intermediary; and
wherein the server is configured to:
   determine whether the security metadata is valid;
   in response to determining that the security metadata is valid, perform one or more operations in accordance with the backend request and the security metadata; and
   in response to determining that the security metadata is not valid, reject the backend request.

2. The system as recited in claim 1, wherein the network intermediary transmits at least a portion of the backend request to the server in plain text.

3. The system as recited in claim 1, wherein the identification of the source of the client request comprises a network protocol header.

4. The system as recited in claim 1, wherein the network intermediary comprises at least one of: a load balancer, a proxy server, or a store-and-forward device.

5. The system as recited in claim 1, wherein the security metadata comprises an indication of a completion of a security analysis of the client request at the network intermediary.

6. A method, comprising:
generating security metadata associated with a client request received at a network intermediary, wherein the security metadata comprises an identification of a source of the client request; and
transmitting an encoded version of the security metadata to a server from the network intermediary, wherein the encoded version is based at least in part on at least a portion of the security metadata and a key held by the network intermediary;
determining, at the server, whether the security metadata is valid;
in response to determining that the security metadata is valid, performing one or more operations responsive to the client request and the security metadata at the server; and
in response to determining that the security metadata is not valid, generating an error response.

7. The method as recited in claim 6, wherein the network intermediary comprises at least one of: a load balancer, a proxy server, or a store-and-forward device.

8. The method as recited in claim 6, further comprising:
prior to generating the security metadata, receiving the client request at the network intermediary over a client connection established between a client and the network intermediary;
wherein said transmitting the encoded version of the security metadata comprises transmitting the encoded version of the security metadata over a server connection established between the network intermediary and the server.

9. The method as recited in claim 6, further comprising:
prior to determining whether the security metadata is valid at the server, transmitting a backend request derived from the client request to the server from the network intermediary over a first server connection established between the network intermediary and the server;
wherein said transmitting the encoded version of the security metadata comprises transmitting the encoded version of the security metadata over a second server connection established between the network intermediary and the server.

10. The method as recited in claim 6, further comprising:
prior to transmitting the encoded version of the security metadata to the server, generating the encoded version using one of: an asymmetric signing technique, a symmetric signing technique, an encryption technique, or a hash-based message authentication code (HMAC).

11. The method as recited in claim 6, wherein the client request is a non-HTTP request formatted in accordance with the Transmission Control Protocol (TCP).

12. The method as recited in claim 6, wherein the security metadata comprises a secure sockets layer (SSL) certificate received at the network intermediary from a client from which the client request was received.

13. A non-transitory computer-accessible storage medium storing program instructions computer-executable to implement:
receiving, at a network intermediary, a client request for a backend service;
in response to said receiving the client request the network intermediary:
generating security metadata associated with the client request, wherein the security metadata comprises an identification of a source of the client request;
creating an encoded version of the security metadata based at least in part on a key and at least a portion of the security metadata; and
transmitting the encoded version of the security metadata to a backend server configured to identify the source of the client request to perform one or more operations responsive to the client request.

14. The non-transitory computer-accessible storage medium as recited in claim 13, wherein the at least a portion of the encoded version of the security metadata is transmitted as a message header in accordance with at least one of: the Hypertext Transfer Protocol (HTTP), or the Transmission Control Protocol (TCP).

15. The non-transitory computer-accessible storage medium as recited in claim 13, wherein the instructions are further computer-executable to implement:
transmitting a backend request derived from the client request to the backend server, wherein the backend server is configured to analyze the backend request to perform the one or more operations responsive to the client request.

16. The non-transitory computer-accessible storage medium as recited in claim 15, wherein at least a portion of the backend request is incorporated within a body of a network message, and wherein at least a portion of the encoded version of the security metadata is incorporated with a header of the network message.

17. The non-transitory computer-accessible storage medium as recited in claim 15, wherein at least a portion of the backend request is transmitted to the backend server in plain text.

18. The non-transitory computer-accessible storage medium as recited in claim 13, wherein the client request is received over a client connection from a client, wherein the encoded version of the security metadata is transmitted to the backend server over a server connection, wherein the instructions are further computer-executable to implement:
terminating the client connection after receiving the client request and before transmitting the security metadata to the backend server.

19. The non-transitory computer-accessible storage medium as recited in claim 13, wherein the security metadata comprises one or more of: an Internet Protocol (IP) address from which the client request is received, an IP address at which the client request is received, a port number at which the client request is received, an IP address of the backend server to which the encoded version of the security metadata is transmitted, a port number of the backend server to which the encoded version of the security metadata is transmitted, or a TCP segment number.

20. The non-transitory computer-accessible storage medium as recited in claim 13, wherein the security metadata comprises an identification of a network interface at which the client request was received.

21. The non-transitory computer-accessible storage medium as recited in claim 13, wherein the security metadata comprises an indication of a completion of a security analysis of the client request.

22. The non-transitory computer-accessible storage medium as recited in claim 13, the instructions are further computer-executable to implement:
prior to transmitting the encoded version of the security metadata to the backend server, selecting the backend server from one or more backend servers based at least in part on a load-balancing algorithm.

23. The non-transitory computer-accessible storage medium as recited in claim 13, wherein the encoded version of the security metadata is generated using a digital signature algorithm.

24. The non-transitory computer-accessible storage medium as recited in claim 13, wherein the security metadata comprises an indication that the Internet Protocol Security (IPSec) protocol was used in receiving the client request.

25. The non-transitory computer-accessible storage medium as recited in claim 13, wherein the security metadata comprises a secure sockets layer (SSL) certificate received from a client from which the client request was received.

* * * * *